United States Patent
Gaag et al.

(10) Patent No.: US 9,301,515 B2
(45) Date of Patent: Apr. 5, 2016

(54) HORSESHOE AND COPPER-ZINC ALLOY FOR A HORSESHOE

(71) Applicant: DIEHL METALL STIFTUNG & CO. KG, Roethenbach (DE)

(72) Inventors: Norbert Gaag, Lauf (DE); Juergen Geise, Nuernberg (DE); Freidrich Gebhard, Lauf/Peg (DE)

(73) Assignee: Diehl Metall Stiftung & Co. KG, Roethenbach (DE)

( * ) Notice: Subject to any disclaimer, the term of this patent is extended or adjusted under 35 U.S.C. 154(b) by 0 days.

(21) Appl. No.: 14/844,803

(22) Filed: Sep. 3, 2015

(65) Prior Publication Data

US 2015/0373964 A1 Dec. 31, 2015

Related U.S. Application Data

(63) Continuation of application No. PCT/EP2013/003498, filed on Nov. 20, 2013.

(30) Foreign Application Priority Data

Mar. 12, 2013 (DE) .......... 10 2013 004383

(51) Int. Cl.
*C22C 9/05* (2006.01)
*A01L 11/00* (2006.01)
*A01L 9/00* (2006.01)

(52) U.S. Cl.
CPC .. *A01L 11/00* (2013.01); *A01L 9/00* (2013.01)

(58) Field of Classification Search
CPC ................. A01L 11/00; A01L 9/00
USPC ............................................. 59/61
See application file for complete search history.

(56) References Cited

U.S. PATENT DOCUMENTS

| 3,780,810 A * | 12/1973 | Ashton | A01L 1/02 148/540 |
| 4,655,293 A * | 4/1987 | Criner | A01L 1/02 168/4 |
| 8,435,361 B2 | 5/2013 | Gaag et al. | |
| 2008/0219881 A1 | 9/2008 | Gaag | |
| 2013/0105180 A1* | 5/2013 | Valer Fuentes | A01L 1/00 168/4 |

FOREIGN PATENT DOCUMENTS

| DE | 2902032 A1 | 7/1980 |
| DE | 2919478 A1 | 11/1980 |
| DE | 102004058318 A1 | 6/2006 |
| DE | 102005015467 A1 | 10/2006 |
| EP | 1219861 * | 9/2014 |
| GB | 2049727 A | 12/1980 |
| JP | 55113862 A | 9/1980 |
| WO | 2011156931 A1 | 12/2011 |
| WO | 2014139548 A1 | 9/2014 |

* cited by examiner

*Primary Examiner* — David B Jones
(74) *Attorney, Agent, or Firm* — Laurence A. Greenberg; Werner H. Stemer; Ralph E. Locher

(57) ABSTRACT

A copper-zinc alloy that is particularly suitable as a material for a horseshoe includes at least the following components, in percent by weight: 59-73% of copper, 2.7-8.5% of manganese, 1.5-6.3% of aluminum, 0.2-4% of silicon, 0.2-3% of iron, 0-2% of lead, 0-2% of nickel, 0-0.4% of tin, balance zinc and unavoidable impurities.

10 Claims, 2 Drawing Sheets

HORSESHOE AND COPPER-ZINC ALLOY FOR A HORSESHOE

CROSS-REFERENCE TO RELATED APPLICATION

This application is a continuation, under 35 U.S.C. §120, of copending international application No. PCT/EP2013/003498, filed Nov. 20, 2013, which designated the United States; this application also claims the priority, under 35 U.S.C. §119, of German patent application No. DE 10 201 3 004 383.2, filed Mar. 12, 2013; the prior applications are herewith incorporated by reference in their entirety.

BACKGROUND OF THE INVENTION

Field of the Invention

The invention relates to a novel use for a copper-zinc alloy having the composition 59-73% of copper, 2.7-8.5% of manganese, 1.5-6.3% of aluminum, 0.2-4% of silicon, 0.2-3% of iron, 0-2% of lead, 0-2% of nickel, 0-0.4% of tin, a balance of zinc and unavoidable impurities. The proportions in percent here and in the following are in each case percent by weight.

The use of a copper alloy as a material for a horseshoe is known from European published patent application EP 0 853 880 A2 and from U.S. Pat. No. 6,059,043. Information about the composition of the copper alloy is not given. Compared to the material steel, which is usually used for a horseshoe, a copper alloy displays higher ductility and thus better processability during forging. The damping behavior of a copper alloy is better than that of steel. In addition, copper has antimicrobial properties which are advantageous in the use as horseshoe.

A disadvantage of a copper alloy compared to steel is that it generally displays a wear resistance which is unsatisfactory for horseshoes. The life of a horseshoe composed of a copper alloy is per se not acceptable compared to a horseshoe composed of steel.

SUMMARY OF THE INVENTION

It is accordingly an object of the invention to provide a horseshoe and a copper alloy for a horseshoe which overcomes the above-mentioned and other disadvantages of the heretofore-known devices and methods of this general type and which provides for a copper alloy that is suitable for use as material for a horseshoe, which has good forgeability for a horseshoe and also exhibits a satisfactorily high wear resistance.

With the foregoing and other objects in view there is provided, in accordance with the invention, a horseshoe and a method of using a copper-zinc alloy for a horseshoe. The copper-zinc alloy comprises:

59-73% by weight of copper,
2.7-8.5% by weight of manganese,
1.5-6.3% by weight of aluminum,
0.2-4% by weight of silicon,
0.2-3% by weight of iron,
optional components of 0-2% by weight of lead, 0-2% by weight of nickel, 0-0.4% by weight of tin, 0-0.1% by weight of at least one element selected from the group consisting of chromium, vanadium, titanium and zirconium, 0-0.0005% by weight of boron, 0-0.03% by weight of antimony, 0-0.03% by weight of phosphorus, 0-0.03% by weight of cadmium, and 0-0.05% by weight of cobalt, and
balance zinc and unavoidable impurities.

In other words, the above and other objects are achieved, according to the invention, by the use of a copper-zinc alloy as material for a horseshoe, wherein the alloy comprises 59-73% of copper, 2.7-8.5% of manganese, 1.5-6.3% of aluminum, 0.2-4% of silicon, 0.2-3% of iron, 0-2% of lead, 0-2% of nickel, 0-0.4% of tin, a balance of zinc and unavoidable impurities.

The invention thus provides a novel use for a copper-zinc alloy which, with a similar composition, is disclosed as a material for synchro rings in German patent DE 2919478 C2. The alloy which is known per se has, in particular, a high coefficient of friction in combination with other intrinsic materials properties. Furthermore, the use of the abovementioned copper-zinc alloy as a material for a valve guide is known from the commonly assigned U.S. Pat. No. 8,435,361 B2 and its counterpart German patent DE 10 2004 058 318 B4. The use as a material for a sliding bearing for the above-mentioned copper-zinc alloy is proposed in the commonly assigned published patent application US 2008/0219881 A1 and its counterpart German application DE 10 2005 015 467 A1.

Due to the comparatively high proportion of α phase, such a copper-zinc alloy displays good ductility and thus good forgability. However, owing to the harder brass mixed crystal and owing to the embedded intermetallic phases, the alloy has a significantly increased hardness compared to copper of from 150 to 200 HB (copper: 40 HB). The abbreviation HB refers to the Brinell hardness which is normally measured, for example, via the indentation diameter of a test ball having a diameter of 2.5 mm at a testing force of 62.5 N. Although the hardness of the alloy gives a high wear resistance, this could indicate a damping behavior which is worse than that of copper.

However, the invention has surprisingly recognized that the damping behavior of the copper-zinc alloy indicated is similar to that of copper and is thus significantly improved compared to steel. The copper-zinc alloy indicated has, like copper, a modulus of elasticity in the range from 100 GPa to 130 GPa. The modulus of elasticity of steel, on the other hand, is in the region of about 200 GPa. The copper-zinc alloy indicated has, like copper, a significantly lower deformation resistance than steel, so that a property advantageous for a horseshoe is present. The foot of a horse shod with a horseshoe composed of the copper-zinc alloy indicated will be subjected to significantly less bounce than in the case of a horseshoe composed of steel.

The copper-zinc alloy can be produced in bar form by melting of the components at temperatures of about 1000° C., subsequent semicontinuous or fully continuous casting and also extrusion with or without drawings at temperatures in the range from 700° C. to 750° C. After cutting the bars to length, the material can be worked further into the basic shape of a horseshoe by drop forging and by cutting machining. As an alternative, the material can be brought into a U-shape as early as the extrusion stage. The basic shapes of the horseshoes, which have additionally been provided with holes for horseshoe nails, are supplied in various sizes. The horseshoe is then individually fitted to the hoof to be shod by hot forging on site.

The copper-zinc alloy having the composition indicated has a microstructure comprising a proportion of α mixed crystal and a proportion of β mixed crystal. The α mixed crystal referred to as α phase and composed of copper and zinc displays a face-centered cubic structure. The β phase or the β mixed crystal has a body-centered cubic structure. Many wear-resistant copper-zinc alloys display predominantly a β phase in the microstructure. This makes the alloy brittle. The ductility is too low for use as horseshoe. However, the copper-zinc alloy indicated has a sufficient proportion of α phase to give the ductility and forgability necessary for a material for a horseshoe. Depending on the specific composition of the alloy and the temperature profile during cooling, the proportion of α phase in the microstructure of the material is from about 40% to 80%.

The hardness of the copper-zinc alloy is determined essentially by the intermetallic phases, in particular by manganese silicides. The hardness of the material can additionally be adjusted via the proportion of β phase in the microstructure. The copper-zinc alloy having the composition indicated is therefore advantageously quenched in water on site, i.e., in particular, at a farrier, after forging. This increases the proportion of β phase in the microstructure of the material, as a result of which the hardness and the wear resistance are increased.

In other words, the present copper-zinc alloy offers, after production by extrusion, cutting to length and drop forging, the advantage of good forgability at a relatively high proportion of α phase. Suitable forging temperatures are in the range from 650° C. to 750° C. (for copper, forging temperatures in the range from 750° C. to 950° C. are necessary). After forging on site, the material is then quenched, as a result of which its wear resistance and its hardness are increased due to the then increased proportion of β phase.

A particular use of the copper-zinc alloy indicated is accordingly for the alloy to be cooled slowly and in particularly passively after casting, for a horseshoe blank to be produced from the cooled alloy, for the horseshoe blank to be worked further on site at a forging temperature in the range from 650° C. to 750° C. and for the horseshoe to be quenched after the further forging to give the finished horseshoe. In particular, quenching is effected by dipping the forged horseshoe into water.

If the proportion of copper is increased to above 73%, an increased application of force is necessary for hot forming or for forging, which is disadvantageous for use as material for a horseshoe. If the proportion of copper is reduced to below 59%, the proportion of β phase in the microstructure increases. The material becomes brittle and then no longer has a sufficient ductility. The proportions of iron, manganese and silicon are present as intermetallic phases in the microstructure and these essentially determine the hardness of the material. Aluminum serves for strengthening the mixed crystal. A proportion of lead improves the cutting machinability of the material. Tin and nickel are dissolved in the material. Nickel here acts as copper substitute. A tolerable proportion of tin and nickel allows further processing of the alloy in the scrap circuit.

In an advantageous embodiment, the alloy comprises 63-73% of copper, 2.7-8.3% of manganese, 1.5-6% of aluminum, 0.2-4% of silicon, 0.2-2% of iron, 0-2% of lead, 0-2% of nickel, 0-0.2% of tin, a balance of zinc and unavoidable impurities. While many wear-resistant copper-zinc alloys have a proportion of copper of less than 63% in order to exploit the higher wear resistance of the hard β phase, the present alloy has a sufficient wear resistance at copper contents of more than 63%. However, if copper is present in a proportion of more than 63% in the material, the material displays a satisfactory antimicrobial action as is a great advantage especially for use for a horseshoe. A horseshoe composed of the advantageously further developed copper-zinc alloy thus combines the advantages of copper, namely an antimicrobial action and good damping behavior, with the advantages of steel, namely a long life and a high wear resistance.

A further embodiment of the copper-zinc alloy comprises 69-72% of copper. The proportion of manganese is advantageously 6-8%. Aluminum is preferably present in a proportion of 4-6%. The proportion of silicon is advantageously selected as 1.5-2.5%. Iron is preferably present in a proportion of 0.5-1.5%. The proportion of lead is advantageously 0-1%. Nickel is preferably present in a proportion of up to 20.2%.

The alloy advantageously further comprises one of the elements chromium, vanadium, titanium or zirconium in a proportion in each case of up to 0.1%. The addition of these elements to the copper-zinc alloy makes the grain size finer.

In addition, the copper-zinc alloy can, for use for a horseshoe, additionally comprise boron in a proportion of ≤0.0005%, antimony in a proportion of ≤0.03%, phosphorus in a proportion of ≤0.03%, cadmium in a proportion of ≤0.03% and cobalt in a proportion of ≤0.05%.

The object indicated at the outset is, according to the invention, also achieved by a horseshoe produced from a copper-zinc alloy having the above-described composition.

For example, a copper-zinc alloy having the composition 70.5% of copper, 7.7% of manganese, 5.2% of aluminum, 1.8% of silicon, 1.1% of iron, balance zinc and unavoidable impurities is produced for a horseshoe by melting of the components at a temperature of 1000° C., subsequent continuous casting and extrusion at a temperature of from 700° C. to 750° C. and subsequently passive cooling to below room temperature. A horseshoe blank is made by cutting to length and drop forging and by cutting machining. The horseshoe blank is hot forged at a temperature of 700° C. for final fitting.

Other features which are considered as characteristic for the invention are set forth in the appended claims.

Although the invention is illustrated and described herein as embodied in use of a copper-zinc alloy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
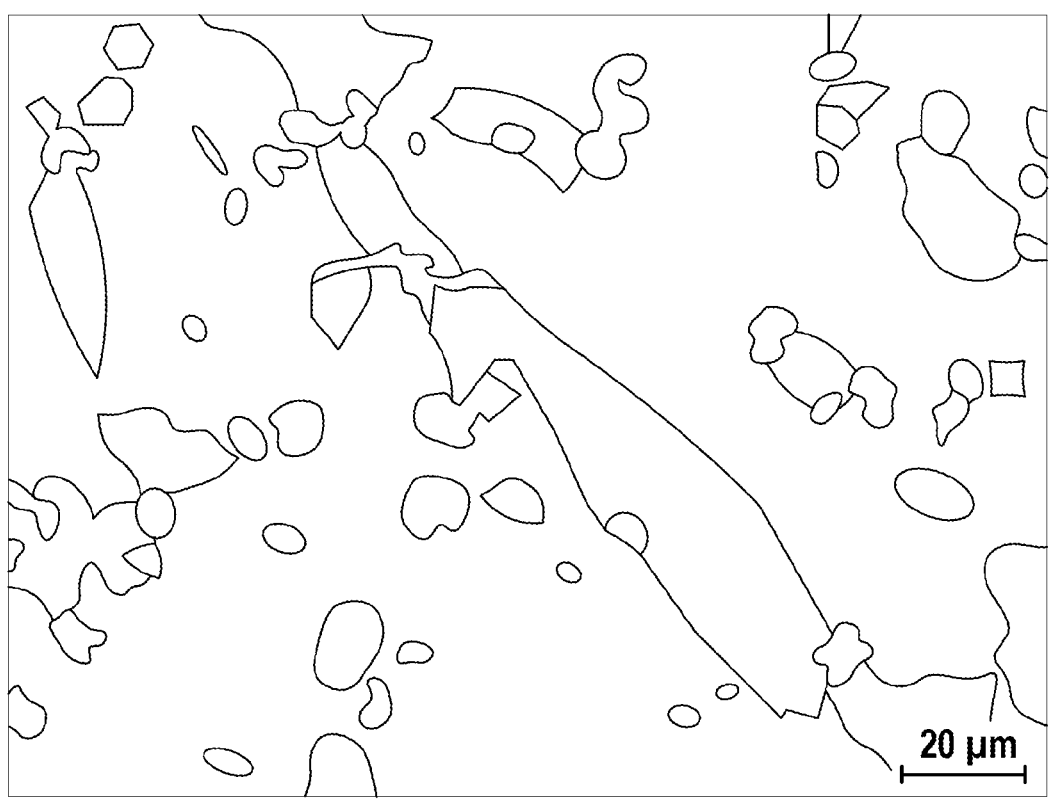
FIG. 1 shows a polished section of the material of such a horseshoe, with the horseshoe having been quenched by dipping into water after hot forging.
Figure 2:
FIG. 2 shows a polished section of the material, with the horseshoe having been cooled slowly to room temperature after hot forging.

It can be seen that the proportion of α phase (light-colored subregion) in the material of FIG. 1 is significantly lower than in the material of FIG. 2. In other words, the proportion of β phase in the microstructure which improves the hardness and the wear resistance has been increased by quenching the material after hot forging. The proportion of β phase (darker surrounding region) in the material of FIG. 2 is about 27%. The proportion of β phase in the material corresponding to FIG. 1 (quenched case) is about 67%. The hardness of the quenched material corresponding to FIG. 1 was determined to be 171 HB. The hardness of the passively cooled material corresponding to FIG. 2 was measured as 168 HB.

The results accordingly show that quenching after on-site forging of the horseshoe enables its hardness and its wear resistance to be influenced further in an advantageous way.

Furthermore, the intermetallic phases embedded in the microstructure are also discernible as very dark regions in FIGS. 1 and 2. The hardness of the material is essentially predetermined by these intermetallic phases, in the present case predominantly manganese silicides.

The invention claimed is:

1. A process of making a horseshoe, the process comprising:
   providing copper-zinc alloy with:
   59-73% by weight of copper,
   2.7-8.5% by weight of manganese,
   1.5-6.3% by weight of aluminum,
   0.2-4% by weight of silicon,
   0.2-3% by weight of iron,
   0-2% by weight of lead,
   0-2% by weight of nickel,
   0-0.4% by weight of tin,
   0-0.1% by weight of at least one element selected from the group consisting of chromium, vanadium, titanium and zirconium,
   0-0.0005% by weight of boron,
   0-0.03% by weight of antimony,
   0-0.03% by weight of phosphorus,
   0-0.03% by weight of cadmium,
   0-0.05% by weight of cobalt,
   balance zinc and unavoidable impurities; and
   forming the copper-zinc alloy into a horseshoe.

2. The process according to claim 1, wherein the alloy comprises:
   63-73% by weight of copper,
   2.7-8.3% by weight of manganese,
   1.5-6% by weight of aluminum,
   0.2-4% by weight of silicon,
   0.2-2% by weight of iron,
   0-2% by weight of lead,
   0-2% by weight of nickel,
   0-0.2% by weight of tin, and
   remainder zinc and unavoidable impurities.

3. The process according to claim 1, wherein the alloy comprises 69-72% by weight of copper.

4. The process according to claim 1, wherein the alloy comprises 6-8% by weight of manganese.

5. The process according to claim 1, wherein the alloy comprises 4-6% by weight of aluminum.

6. The process according to claim 1, wherein the alloy comprises 1.5-2.5% by weight of silicon.

7. The process according to claim 1, wherein the alloy comprises 0.5-1.5% by weight of iron.

8. The process according to claim 1, wherein the alloy comprises 0-1% by weight of lead.

9. The process according to claim 1, wherein the alloy comprises 0-0.2% by weight of nickel.

10. A horseshoe, comprising a copper-zinc alloy material formed into a horseshoe structure, the copper-zinc alloy including:
    59-73% by weight of copper,
    2.7-8.5% by weight of manganese,
    1.5-6.3% by weight of aluminum,
    0.2-4% by weight of silicon,
    0.2-3% by weight of iron,
    0-2% by weight of lead,
    0-2% by weight of nickel,
    0-0.4% by weight of tin,
    0-0.1% by weight of at least one element selected from the group consisting of chromium, vanadium, titanium and zirconium,
    0-0.0005% by weight of boron,
    0-0.03% by weight of antimony,
    0-0.03% by weight of phosphorus,
    0-0.03% by weight of cadmium,
    0-0.05% by weight of cobalt, and
    balance zinc and unavoidable impurities.

* * * * *